US012764661B2

(12) United States Patent
De Vreeze et al.

(10) Patent No.: US 12,764,661 B2
(45) Date of Patent: Oct. 13, 2026

(54) CONFIGURING RADIOFREQUENCY SENSING NODES

(71) Applicant: SIGNIFY HOLDING B.V., Eindhoven (NL)

(72) Inventors: Pieter Diederik De Vreeze, 'S-Hertogenbosch (NL); Gerardus Wilhelmus Theodorus Van Der Heijden, Haaren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 285 days.

(21) Appl. No.: 18/575,917

(22) PCT Filed: Jul. 4, 2022

(86) PCT No.: PCT/EP2022/068465
§ 371 (c)(1),
(2) Date: Jan. 2, 2024

(87) PCT Pub. No.: WO2023/280783
PCT Pub. Date: Jan. 12, 2023

(65) Prior Publication Data

US 2024/0373351 A1 Nov. 7, 2024

(30) Foreign Application Priority Data

Jul. 8, 2021 (EP) .................................... 21184535

(51) Int. Cl.
*H04W 52/02* (2009.01)
*H04W 64/00* (2009.01)

(52) U.S. Cl.
CPC ... *H04W 52/0216* (2013.01); *H04W 52/0245* (2013.01); *H04W 64/006* (2013.01)

(58) Field of Classification Search
CPC ......... H04W 52/0216; H04W 52/0245; H04W 64/006; H04W 4/02; H04W 4/80;
(Continued)

(56) References Cited

U.S. PATENT DOCUMENTS 8,767,771 B1 7/2014 Shukla et al.
2013/0128786 A1 5/2013 Sultan et al.
(Continued)

FOREIGN PATENT DOCUMENTS

WO 2020182719 A1 9/2020
WO WO-2021023725 A1 * 2/2021 ........... H04B 17/318

*Primary Examiner* — Michael A Keller

(57) ABSTRACT

A method of configuring a radiofrequency-based sensing system comprising a first and a second node; wherein the first and the second nodes are operable in an active mode and in a sleep mode according to a wireless communication protocol; wherein the first node comprises a transmitter arranged for transmitting a radiofrequency beacon signal for presence and/or location detection and the second node comprises a receiver arranged for receiving the transmitted radiofrequency beacon signal; wherein the method comprises: switching an operation mode of the first and the second nodes from the sleep mode to the active mode at a predetermined time instance; receiving, at the first and/or the second node, a wireless communication signal indicative of a wakeup time duration for the first and the second node; wherein the wireless communication signal is implemented according to the wireless communication protocol; activating the first node transmitter, upon receiving the wireless communication signal, to transmit the radiofrequency beacon signal during the wakeup time duration; activating the second node receiver, upon receiving the wireless communication signal, to receive the transmitted radiofrequency beacon signal during the wakeup time duration; processing the received radiofrequency beacon signal for presence
(Continued)

and/or location detection; switching the operation mode of the first and the second node to sleep mode upon expiration of the wakeup time duration.

15 Claims, 3 Drawing Sheets

(58) Field of Classification Search
CPC . H04W 8/005; H04W 52/0251; H04W 76/27; H04W 52/0229; H04W 84/18; Y02D 30/70
See application file for complete search history.

(56) References Cited

U.S. PATENT DOCUMENTS

| | | | | |
|---|---|---|---|---|
| 2014/0171120 | A1 | 6/2014 | Callahan | |
| 2019/0162565 | A1 | 5/2019 | Wilson | |
| 2019/0191372 | A1 | 6/2019 | Murali et al. | |
| 2019/0219703 | A1* | 7/2019 | Schreib | G01S 5/0072 |
| 2019/0253968 | A1* | 8/2019 | Xiao | H04W 76/25 |
| 2020/0275369 | A1 | 8/2020 | Foster et al. | |
| 2020/0374970 | A1* | 11/2020 | Wang | H04W 52/0219 |

* cited by examiner

CONFIGURING RADIOFREQUENCY SENSING NODES

CROSS-REFERENCE TO PRIOR APPLICATIONS

This application is the U.S. National Phase application under 35 U.S.C. § 371 of International Application No. PCT/EP2022/068465, filed on Jul. 4, 2022, which claims the benefit of European Patent application Ser. No. 21/184,535.9, filed on Jul. 8, 2021. These applications are hereby incorporated by reference herein.

FIELD OF THE INVENTION

The invention relates to a method of configuring a radiofrequency-based sensing system. The invention further relates to a controller, a system and a computer program product for configuring a radiofrequency-based sensing system.

BACKGROUND

Radiofrequency based sensing is a sensing mechanism involving wireless transceivers (or transmitters/receivers) arranged for transmitting and/or receiving radiofrequency signals. These radiofrequency signals may be beacon signals. The radiofrequency signals may also be used for network communication. These radiofrequency signals when passing through a sensing volume, are affected by movement of a person within the sensing volume e.g., via reflection, absorption. etc. of the radiofrequency signals. The radiofrequency-based sensing uses such deviations of radiofrequency signals to infer presence of the person. Other applications of the radiofrequency-based sensing may involve location detection, fall detection, gesture detection etc. which are also based on how radiofrequency signals are affected in the sensing volume.

For active radiofrequency-based sensing, the radiofrequency signals may comprise actively transmitting radiofrequency beacon signals via a beaconing device and a listening device for receiving the radiofrequency beacon. The received signal may then be processed for presence detection and/or other application of radiofrequency-based sensing.

US 2020/374970 A1 discloses techniques and apparatuses for a user-equipment-coordination set for disengaged mode. In aspects, a base station forms a disengaged-mode-user-equipment coordination set including multiple user equipment operating in a disengaged mode. The disengaged-mode-user-equipment coordination set uses joint transmission and reception to communicate with the base station. The base station communicates control-plane information to an individual user equipment or multiple user equipment in the disengaged-mode-user-equipment coordination set.

SUMMARY OF THE INVENTION

The inventors have realized that for radiofrequency-based sensing, the transmission-reception of radiofrequency beacon signals are one of the main contributors of large power consumption of overall radiofrequency system. Based on different radiofrequency-based sensing applications, the beaconing device uses the radiofrequency transmitter frequently and the receiver of the sensing device needs to be (almost) continuously listening. Therefor a radiofrequency-based sensing application can cause the device to go over-power budget (e.g., may possibly violate legislations).

It is therefore an object of the present invention to optimize or minimize the power consumption of the radiofrequency-based sensing devices and hence the overall power consumption of the radiofrequency-based sensing system.

According to a first aspect, the object is achieved by a method of configuring a radiofrequency-based sensing system comprising a first and a second node; wherein the first and the second nodes are operable in an active mode and in a sleep mode according to a wireless communication protocol; wherein the first node comprises a transmitter arranged for transmitting a radiofrequency beacon signal for presence and/or location detection and the second node comprises a receiver arranged for receiving the transmitted radiofrequency beacon signal; wherein the sensing is based on how the received radiofrequency beacon signal is affected by an object in an environment, wherein the method comprises: switching an operation mode of the first and(/or) the second nodes from the sleep mode to the active mode at a predetermined time instance; receiving, at the first and(/or) the second node, a wireless communication signal; wherein the wireless communication signal is implemented according to the wireless communication protocol; activating the first node transmitter, upon receiving the wireless communication signal, to transmit the radiofrequency beacon signal; activating the second node receiver, upon receiving the wireless communication signal, to receive the transmitted radiofrequency beacon signal; processing the received radiofrequency beacon signal for presence and/or location detection; switching the operation mode of the first and the second node to sleep mode upon expiration of a wakeup time duration.

The method for configuring a radiofrequency-based sensing system may comprise a first node and a second node. The first and/or the second node may be a single node or a set of nodes. The radiofrequency-based sensing system may comprise two, three or any n number of nodes, wherein $n>1$. The configuration of the radiofrequency-based sensing system may involve setting up or adjusting parameters of the radiofrequency-based sensing system which affects the performance of the radiofrequency-based sensing system. The first node may be arranged for transmitting a radiofrequency beacon signal for presence and/or location detection. The second mode may be arranged for receiving the transmitted radiofrequency beacon signal. In an example, when the number of nodes is three, one node may be arranged for transmitting the radiofrequency beacon signal and the other two nodes may be arranged for receiving the transmitted radiofrequency beacon signal. Any other number of nodes and the possible combination of transmitter/receiver may also be envisioned, which for instance, may be based on the radiofrequency-based sensing application, spatial location of the nodes etc.

The first and the second node may comprise a (radio) transmitter and a (radio) receiver arranged for transmitting and receiving the radiofrequency beacon signal respectively. The first node and/or the second node may comprise a processor for processing the received radiofrequency beacon signal for presence and/or location detection. The first and/or the second node may comprise an energy storage element such as a battery to power the operation of the first and/or the second node. Additionally, and/or alternatively, the first and/or the second node may be powered via the mains supply. The beacon signal may comprise node identifier. The beacon signal may comprise other network communication related information.

The received radiofrequency beacon signal may be processed for presence and/or location detection. The radiofrequency-based sensing system may be arranged for presence and/or location detection. These radiofrequency beacon signals when passing through a sensing volume, are affected by movement of an object within the sensing volume e.g., via reflection, absorption. etc. of the radiofrequency signals. The radiofrequency-based sensing uses such deviations of radiofrequency signals to infer presence of the person. Other applications of the radiofrequency-based sensing may involve location detection, fall detection, gesture detection etc. which are also based on how radiofrequency signals are affected in the sensing volume. The sensing may be based on how the radiofrequency beacon signal is affected by an object in an environment. The object may comprise a living object such as a human, an animal etc., or a non-living object such as atmospheric conditions, metal bodies etc. Presence sensing may comprise vital sign detection, gesture detection etc. Additionally, and/or alternatively, other known or future applications of the radiofrequency-based sensing systems (e.g., breathing detection, activity detection, vital sign detection, gesture detection etc.) are not excluded. The processing may be performed by the second node. The processing may be performed by any of the nodes in the radiofrequency-based sensing system. The processing may be performed external to the radiofrequency-based sensing system such as in the cloud, server etc.

The first and the second nodes may be operable in an active mode and in a sleep mode according to a wireless communication protocol. In the active mode, the first and the second node may be arranged for transmitting and receiving the radiofrequency beacon signal respectively. In the sleep mode, the first and the second node may not transmit and receive the radiofrequency beacons respectively. In an example, the nodes may comprise a functional unit, and in the sleep mode the functional units are operating whereas the radios (transmitter/receivers) are not active. In an example, the processor is in active state in the sleep mode and the processing may be performed by the (second) node in the sleep mode.

The method may comprise switching an operation mode of the first and the second nodes from the sleep mode to the active mode at a predetermined time instance. The operation mode characterizes the operation of the nodes. The operation modes may comprise power management modes. The time instance may be according to the wireless communication protocol, such as Wifi. The time instance may be periodic or random. The predetermined time instance may be the same or different for the first and the second node.

The method may further comprise receiving, at the first and/or the second node, a wireless communication signal; wherein the wireless communication signal is implemented according to the wireless communication protocol. The predetermined time instance may be based on the wireless communication signal, e.g., the wireless communication signal may be indicative of the next predetermined time instance of wake up for the first and/or the second node. The nodes may wakeup prior to receiving the wireless communication signal. In an example, the wireless communication signal comprises the time for the reception of the next wireless communication signal. The first and/or the second node may receive the wireless communication signal from an access point (AP). The wireless communication signal may be comprised in a beacon signal from the AP e.g., as a broadcast message. The wireless access point is a networking hardware device that allows other wireless devices (such as Wi-Fi devices) to connect to a wired network. The wireless communication signal may directly be received directly from the AP for instance via a single-hop communication from AP or via a multi-hop communication via multiple nodes. In a wireless network such as Wi-Fi network, an access point may be arranged for controlling the sleep and active modes of the first and/or the second node. The access point may transmit the wireless communication signal which may comprise next time instance for the first and/or the second node for wake up. The wakeup time instance may advantageously synchronize the wakeup time instance for the network nodes such as the first and the second node. The sleep time may be fixed according to the wireless communication protocol or determined by the access point. The predetermined time instance for switching may also be determined by the access point or according to the wireless communication protocol.

The method may further comprise activating the first node transmitter, upon receiving the wireless communication signal, to transmit the radiofrequency beacon signal, for instance, during the wakeup time duration and activating the second node receiver, upon receiving the wireless communication signal, to receive the transmitted radiofrequency beacon signal, for instance, during the wakeup time duration. Upon reception of the wireless communication signal at the first and/or the second node, the transmitter and receiver of the first and the second node are activated respectively for the transmission and reception of radio frequency beacon. The activation of the transmitter/receiver may comprise start of transmission/reception of the radiofrequency beacon signal. It is obvious to the skilled person that the transmission of the radiofrequency beacon signal takes place earlier and then the reception of the transmitted radiofrequency signal takes place.

The method may further comprise processing the received radiofrequency beacon signal for presence and/or location detection. Since, the method may further comprise switching the operation mode of the first and the second node to sleep mode upon expiration of a wakeup time duration, the power consumption of the transmitter/receivers are minimized. The frequency of the transmission of the radiofrequency beacons may be advantageously determined by the wakeup time instance. Furthermore, the wireless communication signal may be used to synchronize the beaconing mechanism (transmission/reception) of the first and the second node. The wakeup time duration may be based on the number of beacon nodes, the accuracy of the internal timer etc. The wakeup time duration may be determined based on the wireless communication signal.

In an embodiment, the wireless communication protocol may be an IEEE 802.11 protocol, and the wireless communication signal may comprise a Delivery Traffic Indication Message (DTIM) signal. In an embodiment, the access point (AP) may be arranged for buffering network communication messages for the first and/or the second node during the sleep mode; and wherein the wireless communication signal may be indicative of the length of the buffered communication messages.

IEEE 802.11 is part of the IEEE 802 set of local area network (LAN) technical standards and specifies the set of media access control (MAC) and physical layer (PHY) protocols for implementing wireless local area network (WLAN) computer communication. IEEE 802.11 standard defines power saving modes which allows a wireless device to reduce its power consumption, to turn off its radios and to wake up at the correct time to retrieve its traffic. In the active mode, the radios are constantly powered and able to receive and transmit and in the sleep mode, the radios are not able to receive and transmit and consumes low power.

During the sleep mode, an access point (AP) buffered the network communication messages or any traffic for the first and the second node. A Delivery Traffic Indication Message (DTIM) signal is used by the AP to inform the nodes about the buffered messages for the first and/or the second node. The DTIM signal may also define the next predetermined time instance for the wakeup for the first and/or the second node. The DTIM signal may be indicate of the wake-up duration. The wakeup duration may be indicative of the length of the buffered communication messages. Such that the nodes stay awake for the messages to receive from AP. Therefore, the frequency of the transmission of the radiofrequency beacons may be advantageously determined by the wakeup time duration provided in the DTIM signal. Furthermore, DTIM may be used to synchronize the beaconing mechanism (transmission/reception) of the first and the second node.

In an embodiment, the first and the second nodes may be further arranged for transmitting and/or receiving radiofrequency signals for network communication.

In this example, the nodes are advantageously arranged for also take part in the network communication. For examples, the node may be a part of a mesh network. In a mesh network, the plurality of nodes does in general not communicate directly with a central controller such as an AP, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. Additionally, and/or alternatively, the nodes may be connected in a start network. In a star network, a central controller such as an AP has a direct wireless communication path to every node in the network. In an example, the network communication messages may be processed for presence and/or location detection.

In an embodiment, a transmission time instance for transmitting the radiofrequency beacon signal after receiving the wireless communication signal (and during the wakeup time duration) may be based on a node identifier and/or the time required to transmit the radiofrequency beacon signal.

In the case where the radiofrequency-based sensing system comprises a plurality of beacon devices, the moment of transmitting the beacon may be determined by their unique identifier and the time needed to transmit a beacon message, such that not all beaconing nodes transmit at the same time, preventing collisions. For example, if messages take 64 us, and there are 3 beaconing devices, device 0 will transmit during a first 64 us slot of the wake time, device 1 at the second 64 us slot etc. In an example, the first and/or the second node may negotiate during the wake-up period the duration to be awake, or type of beacon message, node-id (order), additional intermediate intervals (between DTIM's).

In an embodiment, the method may further comprise processing the received wireless communication signal for presence and/or location detection.

In this example, since the DTIM signal is also a radiofrequency signal, it may also be advantageously processed for presence and/or location detection. This will increase the coverage and resolution for radiofrequency-based sensing system. In an example, for example for security kind of applications, when the sensing nodes that wake up, when receive the DTIM signal, may be configured to calculate the motion (for instance, between AP and the sensing node), and from that derive if there is motion in an environment e.g. home.

In an embodiment, the processing may be based on a received signal strength of the radiofrequency beacon signal and/or wireless communication signal; and/or channel state information (CSI).

In an example, the processing is not related to the content of the beacon signal but related to e.g., signal strength of the received signal. One of the metrics for perform radiofrequency-based sensing is a received signal strength of the radiofrequency beacon signal and/or DTIM signal. RSSI which stands for Received Signal Strength Indicator is an estimated measure of power level that the first and/or the second node are receiving from an access point or router or from other nodes. At larger distances, the signal gets weaker and the wireless data rates get slower, leading to a lower overall data throughput. The variation of RSSI compared to a baseline can be used for presence and/or location detection or other applications of the radiofrequency-based sensing.

Additionally, and/or alternatively, channel state information (CSI) which refers to known channel properties of a communication link describes how a signal propagates from the transmitter to the receiver and represents the combined effect of, for example, scattering, fading, and power decay with distance. Such information may also be used for radiofrequency-based sensing.

In an embodiment, the method may further comprise adjusting rate of transmission of the radiofrequency signal after receiving the wireless communication signal (and during the wakeup time duration) based on one or more of: an intended sensing application of the radiofrequency-based sensing system, presence detection via a second modality, presence of a mobile device in a network.

For most radiofrequency-based sensing applications when a fast response/detection is required or a high precision, then radiofrequency beacons signal need be sent a high rate. This causes the power usage of these devices to be high since the utilisation of the radio is high at the beacon device, to transmit the beacons. Similarly, the sensing device needs to have the radio turned on to receive these messages and to be able to extract signal strength, and/or extract the CSI (Channel State Information) from these messages. Also, the processing that needs to be done on these CSI data, causing a high CPU utilisation. While for many radiofrequency-based sensing applications, such as home automation and security, most of the time such high precision is not necessary. For instance, for home automation, latency between a person walking into a room and being detected by the radiofrequency-based sensing system needs to be as low as possible. Only around this moment a high beacon rate is needed, before and right after the detection the beacon rate can be lowered. In this embodiment, the rate of transmission of the radiofrequency signal is advantageously adjusted to further optimize or minimize the power consumption.

For example, the rate of transmission of the radiofrequency (beacon) signal e.g., during the wakeup time, may be adjusted based on an intended sensing application. Such as for presence detection the rate of transmission may not be as high as compared to what is required for the breathing detection. Additionally, and/or alternatively, the beaconing rate may be adjusted (e.g., increased) if a user possibly enters an environment such as a room. In this case, other presence or motion sensors such PIR, thermopile may be used for presence of a user in the environment and the beaconing rate may be adjusted based on the detection of the presence via the second sensing modality. Furthermore, the beaconing rate may be adjusted based on a presence of a mobile device, such as a tablet, laptop, mobile phone etc. Such a detection may be performed e.g., via by monitoring for certain mobile device related traffic in the network.

Additionally, and/or alternatively the rate of beaconing may be adjusted based for instance on lower rate CSI. For instance, a very stable CSI might mean nobody is in the vicinity while a slight disturbance can be a reason for the sensing node to (temporarily) request a higher beacon frequency from the beacon device. Furthermore, a less precise (e.g., RSSI based) radiofrequency-based sensing algorithm could be used on the beacon device itself. When it detects a slight disturbance, it could (temporarily) increase the beacon frequency. Even furthermore, the beaconing rate may be adjusted e.g., when mobile devices in or in neighbouring rooms have been turned on, for instance by picking up a specific broadcast message on the Wi-Fi network, and/or using learning methods: only turn to higher beaconing rate when the learning system has detected motion from other rooms/zones.

In an embodiment, the method may further comprise adjusting rate of transmission of the radiofrequency beacon signal based on processing of the wireless communication signal for presence and/or location detection.

The beaconing rate may be adjusted by using the DTIM messages from the access points to detect that there is a person (or motion) in the home, and then temporary increase beacon rate. In case during the DTIM messages no disturbance is measured, the beacon rate can be lowered to 0. This allows no additional messages or resource to determine a user presence e.g., at a coarse level.

In an embodiment, the first and/or the second node may be a lighting device. The first and/or the second node may be a part of a lighting system and the first and/or the second node may be lighting devices. The first and/or second may be smart plugs, sensors, or some other device with a radio transmitter/receiver.

In an embodiment, the first and the second node may switch to active mode during the wake-up time period to communicate to e.g., an access point (AP) and in between may communicate e.g., beacon messages for the nodes within the (sensing) environment. In an advanced embodiment, in between time, the nodes may transmit radiofrequency beacon signals not only in the communication signals it is in, and where the other nodes in the environment are in, but the node may transmit the radiofrequency beacon signal on other communication channels, e.g., Wifi channels. The radiofrequency beacon signal transmission on the other communication channels may directed towards the other nodes and/or towards the other access point. It may be useful in a multi-AP environment where a plurality of AP is available. This to accomplish also that the signal can be received in multiple sensing areas in case the nodes of the different sensing areas are not coupled to the same AP. But also to have the nodes being part of multiple sensing areas or different applications, e.g. motion sensing in a room, and in parallel security sensing over multiple rooms/areas or motion sensing over whole floors.

According to a second aspect, the object is achieved by a controller for configuring a radiofrequency-based sensing system comprising a first and a second node; wherein the first and the second nodes are operable in an active mode and in a sleep mode according to a wireless communication protocol; wherein the first node comprises a transmitter arranged for transmitting a radiofrequency beacon signal for presence and/or location detection and the second node comprises a receiver arranged for receiving the transmitted radiofrequency beacon signal; wherein the control device comprises a processor arranged for executing the steps of the method of the first aspect.

According to a third aspect, the object is achieved by a system for configuring a radiofrequency-based sensing system comprising: the controller according to the second aspect; and a first and a second node operable in an active mode and in a sleep mode according to a wireless communication protocol and further arranged for transmitting a radiofrequency beacon signal and the second node is arranged for receiving the transmitted radiofrequency beacon signal for presence and/or location detection.

According to a fourth aspect, the object is achieved by a computer program product comprising instructions which, when the program is executed by a computer, cause the computer to carry out the steps of the method of the first aspect.

It should be understood that the controller, the computer program product and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
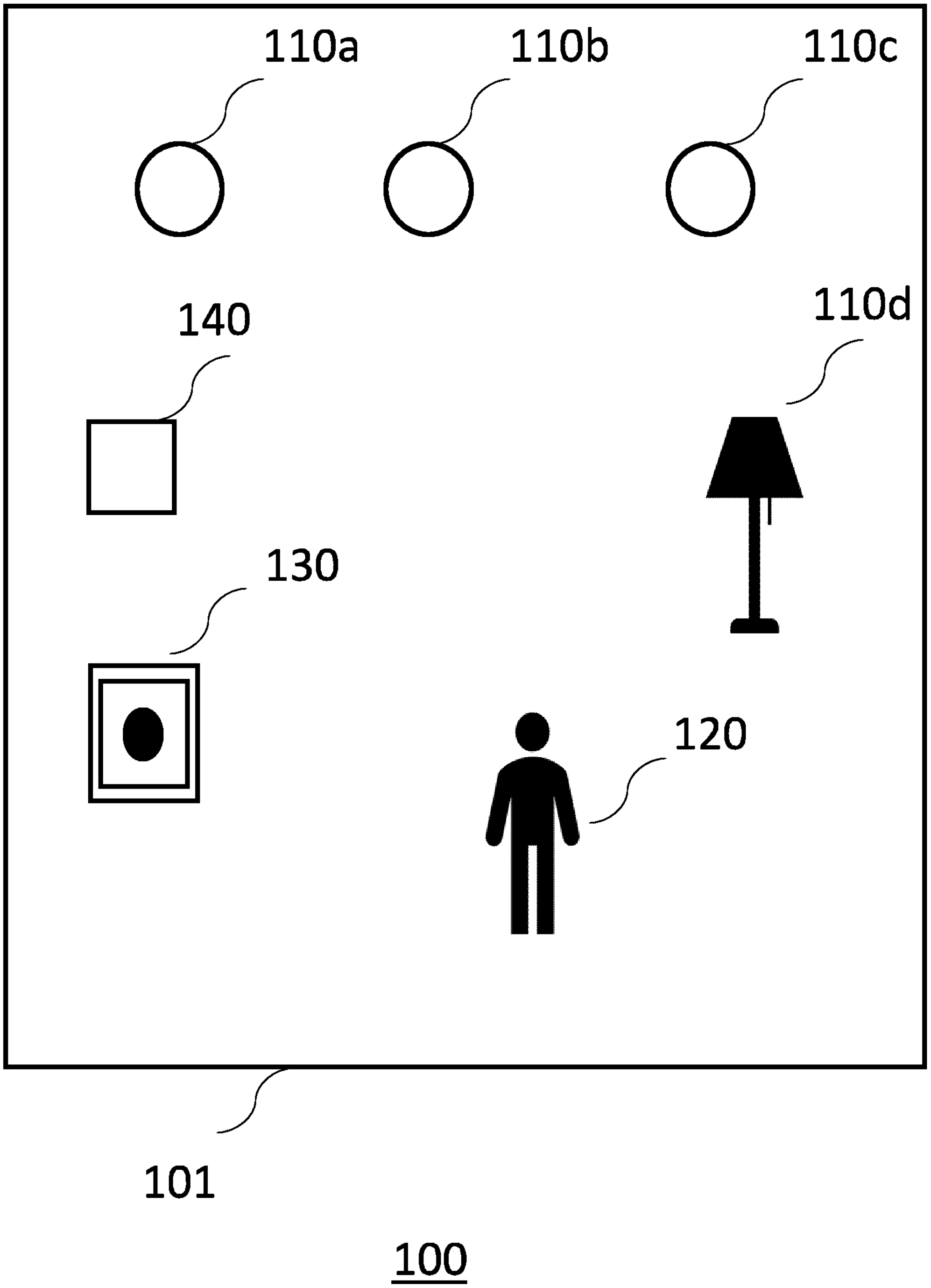
FIG. 1 shows schematically and exemplary an embodiment of a system for configuring a radiofrequency-based sensing system.

FIG. 1 shows schematically and exemplary an embodiment of a system 100 with lighting device(s) 110*a-d* as first and/or the second node for illuminating an environment 101. The first and/or the second node may be a non-lighting device 110*a-d* such as a sensor, an actuator, a smart plug, a beaconing device etc. The environment 101 may be an indoor or an outdoor environment, such as an office, a factory, a house, a grocery store or a hospital, a sports arena, a warehouse etc. The environment 101 defines the sensing volume for radiofrequency-based sensing. In other words, the first and the second nodes which are exemplary shown to be lighting devices 110*a-d* are arranged for performing radiofrequency-based sensing in the environment 101. The system 100 may further comprise an access point (AP) 130.

The system 100 exemplary comprises four lighting devices 110*a-d*. The lighting devices 110*a-d* may be comprised in a lighting system. The lighting system may be a connected lighting system, e.g., Philips Hue, wherein the lighting devices 110*a-d* may be connected to an external network, e.g., Internet. A lighting device 110*a-d* is a device or structure arranged to emit light suitable for illuminating an environment 101, providing or substantially contributing to the illumination on a scale adequate for that purpose. A lighting device 110*a-d* comprises at least one light source or lamp (not shown), such as an LED-based lamp, gas-discharge lamp or filament bulb, etc., (optionally) with an associated support, casing or other such housing. Each of the lighting devices 110*a-d* may take any of a variety of forms, e.g. a ceiling mounted lighting device, a wall-mounted lighting device, a wall washer, or a free-standing lighting device (and the lighting devices need not necessarily all be of the same type). In this exemplary figure, the lighting devices 110*a-c* are ceiling mounted and the lighting device 110*d* is a free-standing lighting device. The system 100 may contain any number/type of the lighting devices 110*a-d*.

The first and the second nodes 110*a-d* may be operable in an active mode and in a sleep mode according to a wireless communication protocol. The wireless communication protocol may be an IEEE 802.11 protocol. IEEE 802.11 standard allows a wireless device to reduce its power consumption, to turn off its radios and to wake up at the correct time to retrieve its traffic. The primary power save mechanism is based on a sleep mode in which the transmitter/receiver radios are not able to transmit or receive. The first and/or the second node may be in one of two power management modes:

- active mode: the first and the second node 110*a-d* is awake all the time. The AP 130 immediately transmits the frames to the first and/or the second node 110*a-d*.

sleep mode: the first and/or the second node 110*a-d* is mostly in not-sensing/receiving state but can also be awake to transmit and receive now and then. In this mode, the AP 130 buffers the eligible frames destined for the first and/or the second node 110*a-d*.

When a node intent to go into sleep mode, it informs the AP 130 by sending a message with the power management flag enabled. From this moment on the AP buffers all the messages for that node. To inform the nodes with the power management flag enabled that the AP has buffered messages for them, a DTIM message part of the 802.11 Beacon message is send at a regular interval (e.g., at a multiple of the Beacon interval, typically 102.4 ms). When the DTIM indicates that multicast messages are waiting, then the nodes need to stay awake after until these are received, as the AP 130 will send this right after the DTIM beacon. When the DTIM message indicates that a unicast message for a node is waiting, then this node needs to inform the AP that it will stay awake to receive these messages by sending a message with the power management flag disabled. The AP 130 will send the buffered messages right after. After having received the last message, the node can inform the AP 130 again that power management is enabled and go back to radio sleep mode.

The communication protocol may be the new Wifi 6 standard which supports a mode called TWT (Target Wake Time), in which the first and the second node may negotiate with the AP 130 on the intervals to be waken up. In that mode the beacons will use the beacon frequency value to negotiate as interval timing with the AP 130. For radiofrequency-based sensing wherein a lower sensing granularity is sufficient, such as home security type of applications, no separate beaconing device would be necessary. In this case the DTIM beacon of the AP can be used as a radiofrequency beacon signal. Since the sensing device already is awake to receive the DTIM beacon, it can extract the CSI information from these DTIM beacon messages and determine whether motion is detected.

Figure 2:
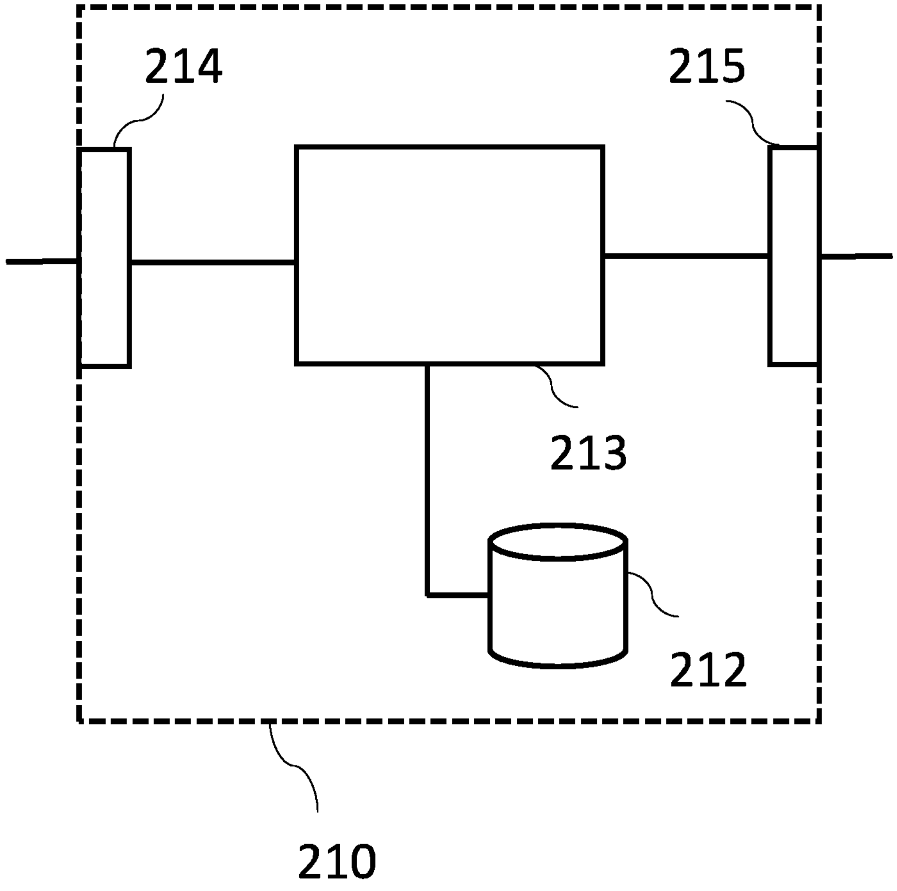
FIG. 2 shows schematically and exemplary an embodiment of a controller for configuring a radiofrequency-based sensing system.

FIG. 2 shows schematically and exemplary an embodiment of a controller 210 for configuring a radiofrequency-based sensing system. The controller 210 may comprise an input unit 214 and an output unit 215. The input 214 and the output 215 units may be comprised in a transceiver (not shown) arranged for receiving (input unit 214) and transmitting (output unit 215) communication signals, e.g., to and from the first and/or the second nodes 110*a-d*. The communication signal may comprise control instructions to control the first and/or the second nodes 110*a-d*, for instance control instructions to activate them. The input unit 214 may be arranged for receiving communication signals from the AP 130. The output unit 215 may be arranged for transmitting communication signals to the AP 130. The controller 210 may further comprise a memory 212 which may be arranged for storing communication IDs of the first and/or the second node 110*a-d*. The memory 212 may further be arranged for storing AP address. The controller 210 may comprise a processor 213 which may be arranged for switching an operation mode of the first and the second nodes from the sleep mode to the active mode at a predetermined time instance; receiving, at the first and/or the second node, a wireless communication signal; wherein the wireless communication signal is implemented according to the wireless communication protocol; activating the first node transmitter, upon receiving the wireless communication signal, to transmit the radiofrequency beacon signal; activating the second node receiver, upon receiving the wireless communication signal, to receive the transmitted radiofrequency beacon signal; processing the received radiofrequency beacon signal for presence and/or location detection; switching the operation mode of the first and the second node to sleep mode upon expiration of the wakeup time duration.

The controller 210 may be implemented in a unit separate from the first and/or the second node 110*a-d*/AP 130, such as wall panel, desktop computer terminal, or even a portable terminal such as a laptop, tablet or smartphone. Alternatively, the controller 210 may be incorporated into the same unit as the AP 130 and/or the same unit as one of the first or the second node 110*a-d*. Further, the controller 210 may be implemented in the environment 101 or remote from the environment (e.g. on a server); and the controller 210 may be implemented in a single unit or in the form of distributed functionality distributed amongst multiple separate units (e.g. a distributed server comprising multiple server units at one or more geographical sites, or a distributed control function distributed amongst the first and/or the second node 110*a-d* or amongst the first and the second node 110*a-d* and the AP 130). Furthermore, the controller 210 may be implemented in the form of software stored on a memory (comprising one or more memory devices) and arranged for execution on a processor (comprising one or more processing units), or the controller 210 may be implemented in the form of dedicated hardware circuitry, or configurable or reconfigurable circuitry such as a PGA or FPGA, or any combination of these.

Regarding the various communication involved in implementing the functionality discussed above, to enable the controller 210, for example, to transmit and receive communication signals, these may be implemented in by any suitable wireless means, such as a local (short range) RF network, e.g., a Wi-Fi, ZigBee or Bluetooth network; or any combination of these and/or other means.

Figure 3:
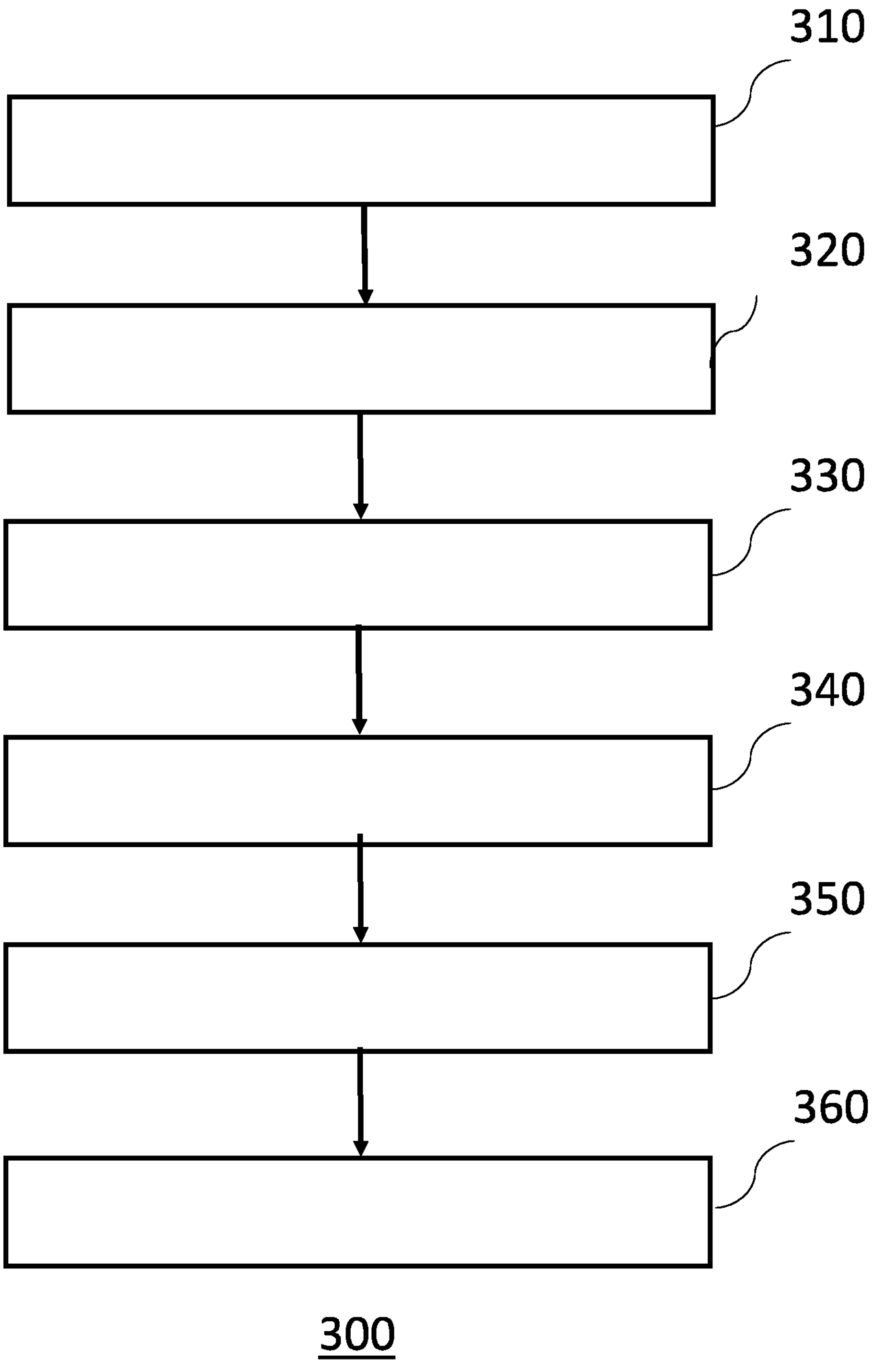
FIG. 3 shows schematically and exemplary a flowchart illustrating an embodiment of a method for configuring a radiofrequency-based sensing system.

FIG. 3 shows schematically and exemplary a flowchart illustrating an embodiment of a method 300 for configuring a radiofrequency-based sensing system. The first and the second nodes 110*a-d* are operable in an active mode and in a sleep mode according to a wireless communication protocol. The wireless communication protocol may be IEEE 802.11 protocol. The first node 110*a-d* may comprise a transmitter (not shown) arranged for transmitting a radiofrequency beacon signal and the second node 110*a-d* comprise a receiver (not shown) arranged for receiving and/or processing the transmitted radiofrequency beacon signal for presence and/or location detection.

The method 300 may comprise switching 310 an operation mode of the first and the second nodes from the sleep mode to the active mode at a predetermined time instance. In an example, the controller 210 may be arranged for setting the time instance for instance based on the time of the arrival of the next wireless communication signal. In another example, the time instance is according to the wireless communication protocol, e.g., according to IEEE802.11 protocol. In another example, the time instance is determined by the AP 130.

The method 300 may comprise receiving 320, at the first and/or the second node, a wireless communication signal; wherein the wireless communication signal is implemented according to the wireless communication protocol. After the first and the second node 110*a-d* wake up, a wireless communication signal is received at the first and/or the second node 110*a-d*. The wireless communication signal, in an example, is a DTIM signal which is implemented in the IEEE 802.11 protocol. The wireless communication signal may indicate the presence of the buffered messages and preferably the length of a wakeup time duration. The wakeup may be based on the length of the buffered messages. The predetermined time instance may be based on the wireless communication signal, e.g., such the wireless communication signal indicates when the next wireless communication signal is expected and such that the next time instance for wakeup for the first and the second device is prior to receiving the wireless communication signal.

The method 300 may comprise activating 330 the first node transmitter, upon receiving the wireless communication signal, to transmit the radiofrequency beacon signal during the wakeup time duration. In an example, the controller 210 may be arranged for sending the activation signal to the first node 110*a-d*. When the wireless communication signal is received at the first node 110*a-d*, the transmitter is activated to transmit the radiofrequency beacon signal for presence and/or location detection. The transmission may be limited to the duration of wakeup time duration, i.e., transmitter is not arranged to transmit after the expiry of wakeup time duration. The transmitter may be activated prior to receiving wireless communication signal, e.g., when it wakes up.

The method 300 may comprise activating 340 the second node receiver, upon receiving the wireless communication signal, to receive the transmitted radiofrequency beacon signal during the wakeup time duration. In an example, the controller 210 may be arranged for sending the activation signal to the second node 110*a-d*. When the wireless communication signal is received at the second node 110*a-d*, the receiver (not shown) is activated to receive the transmitted radiofrequency beacon signal for presence and/or location detection. The reception may be limited to the duration of wakeup time duration, i.e., receiver is not arranged for receiving the transmitted radiofrequency beacon signal after the expiry of wakeup time duration. In an example, the beacon signals are transmitted in the same communication channel. The receiving node may determine if a previous beacon node in a row has transmitted the beacon signal, and then will start to transmit his beacon signal. Since, the beacon signals may be transmitted in the same channel, the nodes may determine who already has transmitted (and avoid other interference signals which can be impacting singals). In an example, the radiofrequency beacon signal is transmitted prior to receiving the wireless communication signal, e.g. when the first node wakesup. One problem with such a transmission is that if the radiofrequency beacon signal is transmitted prior to receiving the wireless communication signal, the second node may be in the sleep mode, therefore, the radiofrequency signal may be advantageously transmitted upon receiving the wireless communication signal to synchronize with the second node.

The method 300 may comprise processing 350 the received radiofrequency beacon signal for presence and/or location detection. The processing 350 may be performed by one or more of the second node 110*a-d*, the first node 110*a-d*, the AP 130, the controller 210, any external device external to above mentioned devices. The processing 350 may be based on a received signal strength of the radiofrequency beacon signal and/or wireless communication signal; and/or channel state information (CSI) to determine the presence and/or location. The processing step may be performed after the switching 360 step.

The method 300 may comprise switching 360 the operation mode of the first and the second node to sleep mode upon expiration of the wakeup time duration.

The method 300 may be executed by computer program code of a computer program product when the computer program product is run on a processing unit of a computing device, such as the processor 213 of the controller 210.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of configuring a radiofrequency-based sensing system comprising a first and a second node; wherein the first and the second nodes are operable in an active mode and in a sleep mode according to a wireless communication protocol;

wherein the first node comprises a transmitter arranged for transmitting a radiofrequency beacon signal for presence and/or location detection and the second node comprises a receiver arranged for receiving the transmitted radiofrequency beacon signal; wherein the sensing is based on how the received radiofrequency beacon signal is affected by an object in an environment, wherein the method comprises:

switching an operation mode of the first and the second nodes from the sleep mode to the active mode at a predetermined time instance;

receiving, at the first and the second node, a wireless communication signal;

wherein the wireless communication signal is implemented according to the wireless communication protocol;

activating the first node transmitter, upon receiving the wireless communication signal, to transmit the radiofrequency beacon signal;

activating the second node receiver, upon receiving the wireless communication signal, to receive the transmitted radiofrequency beacon signal;

processing the received radiofrequency beacon signal for presence and/or location detection of the object; and switching the operation mode of the first and the second node to sleep mode upon expiration of a wakeup time duration.

2. The method according to claim 1, wherein during the sleep mode, the first and the second node do not transmit and receive the radiofrequency beacons respectively.

3. The method according to claim 1, wherein the wireless communication signal is received from an access point (AP).

4. The method according to claim 1, wherein the wireless communication protocol is an IEEE 802.11 protocol, and the wireless communication signal comprises a DTIM (Delivery Traffic Indication Message) signal.

5. The method according to claim 3, wherein the access point (AP) is arranged for buffering network communication messages for the first and/or the second node during the sleep mode; and wherein the wireless communication signal is indicative of the length of the buffered communication messages.

6. The method according to claim 1, wherein the first and the second nodes are further arranged for transmitting and/or receiving radiofrequency signals for network communication.

7. The method according to claim 1, wherein a transmission time instance for transmitting the radiofrequency beacon signal after receiving the wireless communication signal is based on a node identifier and/or the time required to transmit the radiofrequency beacon signal.

8. The method according to claim 1, wherein the method further comprises:

processing the received wireless communication signal for presence and/or location detection.

9. The method according to claim 1, wherein the processing the received radiofrequency beacon signal is based on a received signal strength of the radiofrequency beacon signal and/or wireless communication signal; and/or channel state information (CSI).

10. The method according to claim 1, wherein the method further comprises adjusting rate of transmission of the radiofrequency beacon signal after receiving the wireless communication signal based on one or more of: an intended sensing application of the radiofrequency-based sensing system, presence detection via a second sensing modality, presence of a mobile device in the network.

11. The method according to claim 1, wherein the method further comprises adjusting rate of transmission of the radiofrequency beacon signal based on processing of the wireless communication signal for presence and/or location detection.

12. The method according to claim 1, wherein the first and/or the second node is a lighting device.

13. A controller for configuring a radiofrequency-based sensing system comprising a first and a second node; wherein the first and the second nodes are operable in an active mode and in a sleep mode according to a wireless communication protocol;

wherein the first node comprises a transmitter arranged for transmitting a radiofrequency beacon signal for presence and/or location detection and the second node comprises a receiver arranged for receiving the transmitted radiofrequency beacon signal;

wherein the control device comprises a processor configured to:

switch an operation mode of the first and the second nodes from the sleep mode to the active mode at a predetermined time instance;

receive, at the first and the second node, a wireless communication signal; wherein the wireless communication signal is implemented according to the wireless communication protocol;

activate the first node transmitter, upon receiving the wireless communication signal, to transmit the radiofrequency beacon signal;

activate the second node receiver, upon receiving the wireless communication signal, to receive the transmitted radiofrequency beacon signal;

process the received radiofrequency beacon signal for presence and/or location detection of the object; and switch the operation mode of the first and the second node to sleep mode upon expiration of a wakeup time duration.

14. A system for configuring a radiofrequency-based sensing system comprising:

the controller according to claim 13; and a first and a second node operable in an active mode and in a sleep mode according to a wireless communication protocol and the first node is arranged for transmitting a radiofrequency beacon signal and the second node is arranged for receiving the transmitted radiofrequency beacon signal for presence and/or location detection.

15. A non-transitory computer readable medium comprising instructions which, when the instructions are executed by a processor of a controller, cause the processor to perform the method of claim 1.

* * * * *